United States Patent [19]

Rau

[11] Patent Number: 4,507,920

[45] Date of Patent: Apr. 2, 1985

[54] STEERING CONTROL APPARATUS

[75] Inventor: Jim L. Rau, Lafayette, Ind.

[73] Assignee: TRW Inc., Cleveland, Ohio

[21] Appl. No.: 379,968

[22] Filed: May 19, 1982

[51] Int. Cl.³ .................. F16D 33/00; F16D 33/02
[52] U.S. Cl. .................................. 60/443; 60/446; 60/450; 60/452
[58] Field of Search ............... 60/443, 389, 444, 446, 60/450, 451, 452

[56] References Cited

U.S. PATENT DOCUMENTS 3,742,982  7/1973  Miller .................................. 60/452
4,379,389  4/1983  Liesener .............................. 60/452

OTHER PUBLICATIONS

U.S. patent application Ser. No. 243,497 entitled "Hydrostatic Load–Sense Steering System", filed Mar. 13, 1981 by Jim L. Rau and Ronald L. LaHue, (copies of drawings attached only).

Primary Examiner—Robert E. Garrett
Assistant Examiner—John M. Husar
Attorney, Agent, or Firm—Yount & Tarolli

[57] ABSTRACT

An improved power steering apparatus includes a variable displacement pump. During a steering operation, a flow control valve effects operation of a motor assembly to vary the displacement of the pump as a function of variations in the demand for power steering fluid. Upon initiation of a steering operation, the displacement of the pump must be quickly increased to enable it to satisfy the impending demand for power steering fluid. Therefore upon initial rotation of a steering wheel, a steering controller restricts a flow of fluid to operate the motor assembly independently of the flow control valve. The displacement of the pump can thus increase before the flow control valve can be actuated during an initial portion of a steering operation.

10 Claims, 6 Drawing Figures

STEERING CONTROL APPARATUS

BACKGROUND OF THE INVENTION

This invention relates to a new and improved steering apparatus and more specifically to a steering apparatus in which the displacement of a pump is increased upon initiation of a steering operation.

A known apparatus for varying the displacement of a pump in response to variations in demand for fluid includes a flow control valve. The flow control valve is operable from an intermediate position to either one of two actuated positions to operate a motor to either increase or decrease the displacement of the pump. When the displacement of the pump matches fluid flow requirements, the flow control valve is in the intermediate position and the displacement of the pump is maintained constant. When the demand for fluid increases or decreases, the flow control valve is actuated to change the displacement of the pump. With this known system, the flow control valve must be actuated before the displacement of the pump is increased.

A known apparatus for controlling the operation of a steering motor to turn a steerable vehicle wheel is disclosed in U.S. patent application Ser. No. 243,497 filed Mar. 13, 1981 by Jim L. Rau and Ronald L. LaHue and entitled "Hydrostatic Load-Sense Steering System". This application discloses a priority valve which responds to changes in the demand for fluid by a steering controller. Upon initiation of a steering operation, a pilot flow of fluid is restricted. The pilot fluid flow restriction causes a back pressure to develop in a pilot fluid flow line. This back pressure acts on a priority valve spool to move the spool into a position to direct an increased fluid flow to the steering controller. Although the steering system shown in the aforementioned application is generally satisfactory in its mode of operation and is effective to respond quickly to changes in the demand for fluid by the power steering system, the priority valve must be actuated before the demand for steering fluid is satisfied.

When a variable displacement pump is used in a power steering system, the displacement of the pump must be quickly increased upon initiation of a steering operation in order to satisfy the impending demand for power steering fluid. If increasing the displacement of the pump is delayed until after a flow control valve is actuated, the pump may not be able to satisfy the demand for power steering fluid during an initial portion of a steering operation.

BRIEF SUMMARY OF THE INVENTION

The present invention provides a steering control apparatus which includes a variable displacement pump. Upon initiation of a steering operation, the displacement of the pump is quickly increased by a motor assembly without waiting for actuation of a control valve. This enables the pump to satisfy the demand for power steering fluid during an initial portion of a steering operation.

In order to provide a rapid increase in the displacement of the pump without waiting for actuation of a flow control valve, a steering controller blocks a pilot flow of fluid from a chamber of the motor assembly upon initiation of a steering operation. This results in an increase in the fluid pressure in the chamber to operate the motor assembly and increase the displacement of the pump. Since the pilot flow of fluid is immediately blocked by the steering controller without waiting for actuation of an intermediate flow control valve, the displacement of the pump can be quickly increased upon initiation of a steering operation to satisfy an impending demand for fluid.

Accordingly, it is an object of this invention to provide a new and improved apparatus for controlling operation of a steering motor to turn a steerable vehicle wheel and wherein the apparatus is operable to increase the displacement of a pump independently of operation of a flow control valve upon initiation of a steering operation.

Another object of this invention is to provide a new and improved apparatus for controlling operation of a steering motor to turn a steerable vehicle wheel and wherein the apparatus includes a motor assembly which is operable to vary the displacement of a pump and a steering controller which is operable to block a flow of fluid from the motor assembly upon initiation of a steering operation to thereby initiate an increase in the displacement of the pump.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

General Description

Figure 1:
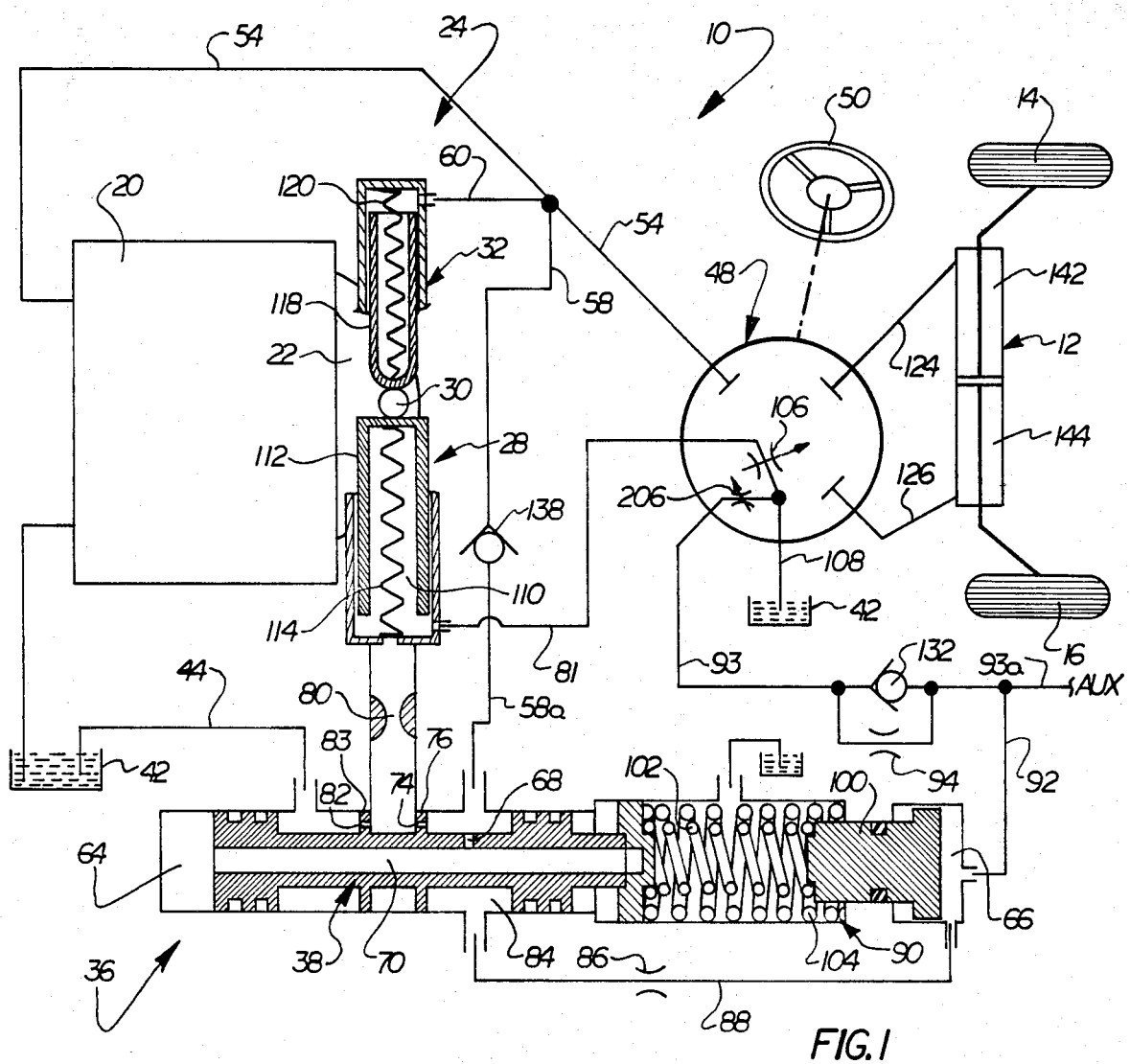
FIG. 1 is a schematic illustration depicting the relationship between a variable displacement pump, a motor assembly for varying the displacement of the pump, a steering controller, and a flow control valve, the steering controller being shown in a neutral condition directing pilot fluid flow from the motor and flow control valve assemblies to a reservoir.
Figure 2:
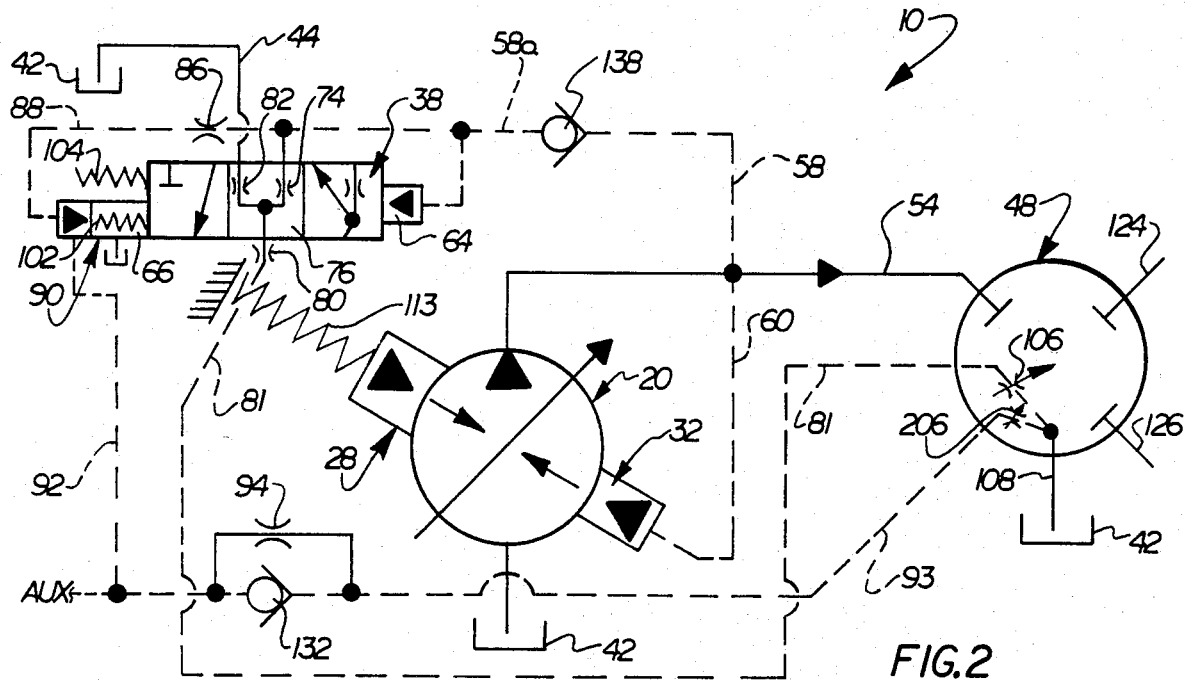
FIG. 2 is a schematicized illustration of the apparatus of FIG. 1 and further illustrating the relationship between the variable displacement pump, flow control valve, and steering controller.

An apparatus 10 for controlling the operation of a steering motor 12 to turn steerable vehicle wheels 14 and 16 is illustrated in FIGS. 1 and 2. The apparatus 10 includes a variable displacement pump 20 having a control arm or lever 22 (FIG. 1) which is moved by a fluid pressure responsive motor assembly 24 to vary the displacement of the pump 20. Thus, the motor assembly 24 includes an up stroke actuator assembly 28 which is extended upwardly (as viewed in FIG. 1) to move a pin 30 connected with the control arm 22 to increase the displacement of the pump 20. The motor assembly 24 also includes a down stroke actuator assembly 32 which is extended downwardly (as viewed in FIG. 1) to move the pin 30 and arm 22 to decrease the displacement of the pump 20.

The apparatus 10 also includes a flow control valve 36 which controls operation of the motor assembly 24 to vary the displacement of the pump 20 as a function of the demand for steering fluid during a steering operation. The flow control valve 36 includes a valve spool 38. The valve spool 38 is movable in one direction, that is toward the left as viewed in FIG. 1, to direct fluid pressure to the up stroke actuator assembly 28. The increased fluid pressure results in the motor assembly 24 being operated to increase the displacement of the pump 20. The valve spool 38 is movable in the opposite direction, that is toward the right as viewed in FIG. 1, to connect the up stroke actuator assembly 28 with a reservoir or drain 42 through a conduit 44. The reduction in fluid pressure permits the motor assembly 24 to be operated to reduce the displacement of the pump 20.

A steering controller 48 is connected in fluid communication with the motor assembly 24, flow control valve 36 and steering motor 12. Upon rotation of a steering wheel 50, the steering controller 48 directs fluid to the steering motor 12 to turn the steerable vehicle wheels 14 and 16 in a known manner. Although the steering controller 48 could be constructed in many different ways, it is contemplated that the steering controller will be constructed in a manner generally similar to that disclosed in U.S. patent application Ser. No. 243,497, filed Mar. 13, 1981 by Jim L. Rau and Ronald L. LaHue and entitled "Hydrostatic Load-Sense Steering System". Therefore, the disclosure in the aforementioned Rau and LaHue Application Ser. No. 243,497 is to be considered as being incorporated herein by this reference thereto.

In accordance with one of the features of the present invention, the steering controller 48 effects operation of the motor assembly 24 to increase the displacement of the pump 20 independently of the flow control valve 36 upon initiation of a steering operation. Since the displacement of the pump 20 is increased independently of operation of the control valve 36, the displacement of the pump is immediately increased upon initiation of a steering operation without waiting for actuation of the control valve. This enables the displacement of the pump 20 to be quickly increased during an initial portion of a steering operation to satisfy an impending demand for steering fluid.

Condition of Apparatus Prior to Initiation of a Steering Operation

Prior to initiation of a steering operation, the steering controller 48 is in the condition shown in FIGS. 1 and 2. At this time, there is a pilot flow of fluid from the engine driven pump 20 to a main supply conduit 54. Fluid flow through the main supply conduit 54 to the steering motor 12 is blocked by the steering controller 48.

The flow of pilot fluid is conducted from the main supply conduit 54 to the flow control valve 36 through a conduit 58. In addition, pilot fluid pressure is transmitted through a conduit 60 to the down stroke actuator assembly 32. At the flow control valve 36, pilot fluid pressure is divided into a plurality of branches. One of these branches is connected with a pressure chamber 64 at the left end of the valve as viewed in FIG. 1. Another of these branches is connected with a pressure chamber 66 at the right end of the valve as viewed in FIG. 1. Still another branch of the pilot flow of fluid is conducted to the motor assembly 24.

In the specific embodiment of the invention illustrated in FIG. 1, the pilot fluid pressure is transmitted to the chamber 64 from the conduit 58 through a radial passage 68 and an axial passage 70 in the valve spool 38. The passage 70 extends through the center of the valve spool 38 to the variable volume chamber 64. The pilot fluid pressure in the variable volume chamber 64 urges the valve spool toward the right (as viewed in FIG. 1).

The pilot fluid pressure is also conducted to the chamber 66 at the right (as viewed in FIG. 1) end of the valve spool 38. Thus, a flow of pilot fluid is conducted from the conduit 58 through an annular recess 84 (FIG. 1) in the valve spool 38 to a flow control valve, pilot orifice 86 in a conduit 88. The conduit 88 is connected in fluid communication with the chamber 66. The pilot fluid flow is conducted from the chamber 66 to the steering controller 48 through a conduit 92, orifice 94, and conduit 93. The orifice 94 also acts as a system bleed for any pilot signals from auxiliary hydraulic functions. Within the steering controller, variable size (i.e., area) orifice 206 vents pilot flow from the flow control valve to the reservoir 42.

The pilot fluid pressure in conduit 92 from either the steering pilot fluid conduit 93 or the auxiliary pilot fluid conduit 93a causes fluid pressure to be maintained in the variable volume chamber 66 (FIG. 1) of a biasing assembly 90 to urge a piston 100 toward the left (as viewed in FIG. 1). This results in the application of a variable biasing force to the valve spool 38 through a pressure control relief spring 102. A biasing force is also applied to the valve spool 38 by a second or flow control spring 104 which is coaxial with the spring 102.

Figure 6:
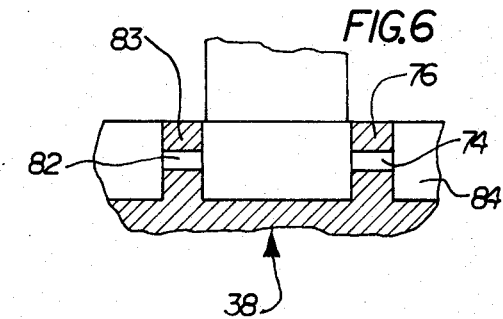
FIG. 6 (on sheet 1 of the drawings) is an enlarged fragmentary illustration of a portion of the flow control valve of FIG. 1.

In addition, a portion of the pilot flow of fluid is conducted through an orifice 74 (see FIGS. 1 and 6) formed axially through a land 76 of the valve spool 38. From the orifice 74, part of the fluid flows away from the valve spool 38 through a second orifice 80 (FIG. 1) which is connected in fluid communication with the up stroke acutator assembly 28. From the up stroke actuator assembly 28, the pilot flow of fluid is conducted through a conduit 81 to the steering controller 48. When the steering controller 48 is in the neutral condition shown in FIGS. 1 and 2, the pilot flow of fluid in the conduit 81 passes through an open variable size orifice 106 in the controller 48 to a conduit 108 leading to the reservoir. In addition a portion of the pilot flow through the orifice 74 is conducted to reservoir or drain through an orifice 82 (FIGS. 1 and 6) formed axially through a second land 83 on the valve spool 38.

The displacement of the pump 20 is matched to the demanded steering or auxiliary flow requirements plus the standby pilot flows and pressure. If the displacement of the pump 20 is less than the displacement required to satisfy fluid flow or pressure requirements, the valve spool 28 moves to the left from the unactuated position of FIG. 1 to direct pilot fluid to the upstroke actuator assembly 28 without passing through the orifice 74. Similarly, if the displacement of the pump 20 is greater than the displacement required to satisfy fluid flow requirements, the valve spool 38 moves to the right from the unactuated position of FIG. 1 to connect the upstroke actuator assembly with the reservoir 42 without passing through the orifice 82.

When the displacement of the pump 20 matches fluid flow requirements, the valve spool 38 is in the unactuated position shown in FIG. 1. At this time, the biasing force applied against the left end (as viewed in FIG. 1) of the valve spool 38 by the pilot fluid pressure in the chamber 64 is balanced by the biasing forces applied against the right end (as viewed in FIG. 1) of the valve spool by the biasing springs 102 and 104. The balancing of biasing forces results in the valve spool 38 being held in the intermediate or unactuated position shown in FIG. 1.

Since the displacement of the pump 20 is matched to the pilot fluid flow requirements, the forces exerted on the pin 30 (see FIG. 1) by the up stroke actuator assembly 28 and the down stroke actuator assembly 32 are equal. However, the up stroke actuator assembly 28 has a relatively large diameter cylinder chamber 110 in which a piston 112 is biased upwardly toward the pin 30 by a relatively strong coil spring 114. The down stroke actuator assembly 32 has a relatively small diameter piston 118 which is urged toward the pin 30 by a relatively weak coil spring 120. Spring 113 (FIG. 2) schematically represents the net force of springs 120 and 114 and provides for the pump start bias.

To offset the relatively large diameter piston 112 and strong spring 114 in the up stroke actuator assembly 28, the pilot fluid pressure conducted to the up stroke actuator assembly is smaller than the pilot fluid pressure conducted to the down stroke actuator assembly 32. The piston 118 in the down stroke actuator assembly 32 is exposed to pump output pressure which is transmitted directly from the main conduit 54 through the conduit 60. The relatively large diameter piston 112 in the up stroke actuator assembly 28 is exposed to a fluid pressure which is substantially reduced by the effect of the orifices 74, 80 and 82. The combined effect of the reduced fluid pressure applied against the piston 112 and the biasing spring 114 in the up stroke actuator assembly 28 is able to just balance the combined effect of the fluid pressure applied against the piston 118 and the spring 120 in the down stroke actuator assembly 32 when the displacement of the pump 20 matches fluid flow requirements.

Initiation of a Steering Operation

Figure 3:
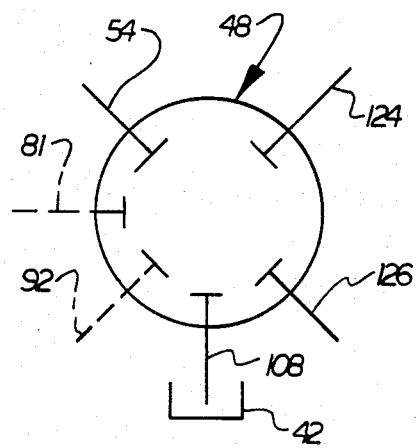
FIG. 3 is a fragmentary schematic illustration depicting the steering controller in a transient condition blocking pilot fluid flow.
Figure 4:
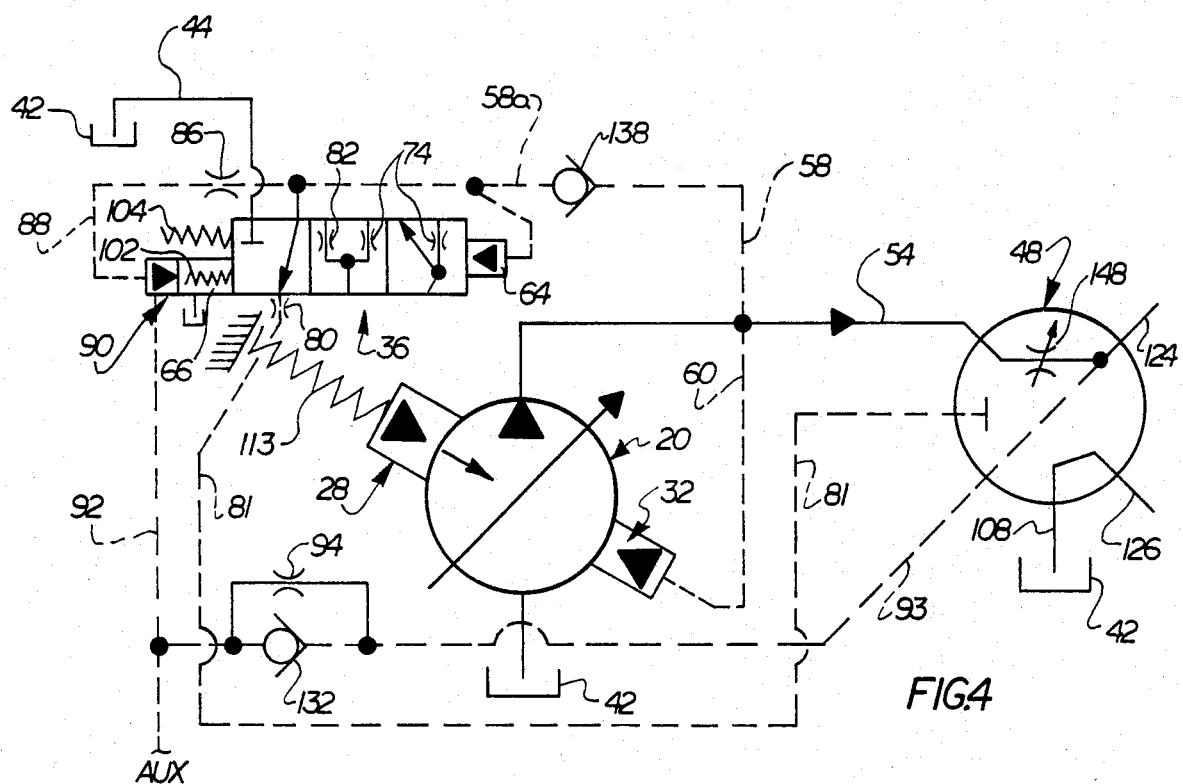
FIG. 4 is a schematic illustration, generally similar to FIG. 2, illustrating the steering controller in an actuated condition during a steering operation, the flow control valve being shown in an actuated condition directing fluid flow to the motor assembly to increase the displacement of the pump in response to an increase in demand for steering fluid.

Upon initiation of a steering operation, the steering controller 48 is operated from the neutral condition shown in FIG. 2 through a transition condition shown in FIG. 3 to an actuated condition shown in FIG. 4. Thus in response to the first increment of rotation of the steering wheel 50, the controller 48 is operated from the neutral condition of FIG. 2 to the transition condition shown in FIG. 3. When the steering controller 48 is in the transition condition, fluid flow through the controller is restricted or blocked.

Blocking the pilot flow of fluid through the conduit 81 (FIGS. 1 and 2) causes an immediate increase in the fluid pressure in the up stroke actuator assembly 28. This is because the initial increment of rotation of the steering wheel 50 actuates the controller 48 to block fluid flow from cylinder chamber 110 (FIG. 1) of the up stroke actuator assembly 28. The increased fluid pressure is applied against the piston 112 since the orifice 80 impedes reverse flow from the chamber 110. To further enhance the response of the motor assembly 24, check valve 138 isolates pilot flow conduit 58a from the conduits 58 and 60 connected in communication with the down stroke actuator assembly 32. Therefore, the down stroke actuator assembly 32 does not impede operation of the up stroke actuator assembly. The piston 112 then moves the actuator arm 22 to increase the displacement of the pump 20.

Blocking the fluid flow to the power steering motor 12 through the conduits 124 and 126 (FIG. 1) permits the up stroke actuator assembly 28 to initiate an increase in the displacement of the pump 20 before the controller 48 directs fluid flow to the steering motor 12. The displacement of the pump 20 is increased upon initial actuation of the steering controller 48 to enable the pump to satisfy the impending demand for fluid by the steering motor 12.

When the steering controller 48 is operated from the transition condition of FIG. 3 to the actuated condition of FIG. 4, the pilot flow of fluid through the conduit 81 is still blocked. Therefore the fluid pressure in the chamber 110 of the up stroke actuator assembly 28 continues to increase as fluid from the pump 20 is ported by the steering controller 48 to the steering motor 12 through the conduit 124 or the conduit 126.

Operation of the steering controller 48 to the transition condition (FIG. 3) also initiates actuation of the flow control valve 36. Thus, operation of the steering controller 48 to the transition condition of FIG. 3 blocks the flow of fluid through the conduit 92 via restricting orifice 206. The resulting back pressure is transmitted through a check valve 132 to the pressure chamber 66 (FIG. 1) in the biasing assembly 90. The increase in fluid pressure in the chamber 66 urges the piston 100 toward the left (as viewed in FIG. 1) to initiate actuation of the flow control valve 36 simultaneously with operation of the up stroke actuator assembly 28.

As the pressure builds up in the chamber 66 of the valve actuator assembly 90, the land 76 on the flow control valve spool 38 moves toward the left. When the orifice 74 has moved through a sufficient distance toward the left (as viewed in FIG. 1), fluid can flow directly from the conduit 58 through the orifice 80 to the up stroke actuator assembly 28. The flow of fluid is required in order to maintain fluid pressure in the actuator assembly 28 as it is extended to move the control arm 22 and increase the displacement of the pump 20.

Operation of the flow control valve 36 from the intermediate or neutral condition shown schematically in FIG. 2 to the actuated condition shown in FIG. 4 is initiated simultaneously with initiation of operation of the up stroke actuator assembly 28. This occurs after the steering controller 48 has been actuated from the neutral condition shown in FIG. 2 to the transition condition shown in FIG. 3. Therefore, the up stroke actuator assembly 28 starts to increase the displacement of the pump 20 before the valve assembly 36 reaches the actuated condition shown in FIG. 4.

When the steering controller 48 is operated from the neutral condition of FIG. 2 to the transition condition of FIG. 3, the blockage of pilot fluid flow by the steering controller tends to raise the fluid pressure in the conduits 88 and 58a along with the flow pressure in the chamber 66 of the biasing assembly 90. A check valve 138 in conduit 58 prevents transmission of the fluid pressure increase in the conduit 58 to the down stroke actuator assembly 32 and pump 20. Check valve 138 is located between the flow control valve 36 and the conduits 60 and 54 leading to the down stroke actuator assembly 32 and pump 20. If the check valve 138 was omitted, the increase in pilot flow of fluid pressure would be transmitted to the down stroke actuator assembly 32 and would oppose operation of the up stroke actuator assembly 28. This would impede increasing the displacement of the pump 20. In addition, omission of the check valve 138 would enable the pilot fluid pressure increase to be communicated to and at least partially dissipated at the pump 20.

Steering Operation

After initiation of a steering operation and actuation of the steering controller 48 from the neutral condition of FIG. 3 through the transition condition of FIG. 2 to the actuated condition of FIG. 4, fluid flow from the pump 20 is directed from the main conduit 54 to the power steering motor 12. Depending upon the direction in which the wheels 14 and 16 are to be turned, high pressure fluid is directed to one of the conduits 124 or 126. The other conduit 126 or 124 is connected to reservoir 42 by the steering controller 48. In the turning situation illustrated schematically in FIG. 4, high pressure fluid from the pump 20 is being directed by the steering controller 48 to a chamber 142 (FIG. 1) of the motor 12 through the conduit 124 and a chamber 144 of the motor is being exhausted to the reservoir 42 through a conduit 126.

During the main portion of the steering operation, variations in the demand for fluid by the steering motor 12 due to changes in the rate of rotation of the steering wheel 50 are satisfied by varying the displacement of the pump 20 under the influence of the flow control valve 36. Thus, when the displacement of the pump 20 is sufficient to satisfy the instantaneous demand for fluid by the steering motor 12, the flow control valve 36 returns to the initial or intermediate condition shown in FIG. 2. The fluid pressure force in the chamber 64 is then balanced against the combined forces of fluid pressure and springs 102 and 104 in the biasing assembly 90.

During a steering operation when the steering controller 48 is actuated (FIG. 4) and the demand for fluid is satisfied so that the flow control valve 36 is in the intermediate position (FIG. 2), there is a flow of fluid from the biasing assembly 90 through the conduit 92, orifice 94 and steering controller 48 to the conduit 124 leading to the steering motor 12 (see FIG. 4). In addition, a pilot flow of fluid is conducted through the orifices 74 and 82 (FIG. 2) in the flow control valve 36 to the reservoir 42 through the conduit 44 (see FIG. 2). The flow of pilot fluid through the conduit 81, however, is blocked by the steering controller, which is in the actuated condition shown in FIG. 4.

If the rate of rotation of the steering wheel 50 is increased during the steering operation, the size of an orifice 148 (FIG. 4) in the steering controller 48 is increased in accordance with demand of the steering controller's metering unit (not shown) as is known in the art. This results in a reduction in the pressure drop across the orifice 148. Therefore the fluid pressure in the conduit 54 is decreased and the fluid pressure downstream from the orifice 148 is increased. These two changes in fluid pressure are utilized to effect a rapid response of the flow control valve 36 and motor assembly 24 to increase the displacement of the pump 20 in response to the increased demand for steering fluid.

The decrease in the fluid pressure in the conduit 54 in response to an increased demand for fluid and an increase in the size of the controller orifice 148, causes the check valve 138 to close. The fluid pressure in the biasing chamber 64 is then decreased due to the fluid flow to reservoir 42 through the orifices 74 and 82 in the flow control valve 36 which is in the intermediate condition shown in FIG. 2.

The increase in the fluid pressure downstream of the orifice 148 is transmitted through the check valve 132, which bypasses the auxiliary bleed orifice 94, and the conduit 94 (see FIG. 4) to the biasing assembly 90 to increase the fluid pressure in the chamber 66 (see FIG. 1). Increasing the fluid pressure in the chamber 66 causes the piston 100 to move toward the valve spool 38 to urge the valve member toward the left as viewed in FIG. 1.

The combined effect of the reduction of the fluid pressure in the chamber 64 (FIG. 1) and the increase in the fluid pressure chamber 66 results in the flow control valve 36 being operated from the intermediate condition shown in FIG. 2 to the actuated condition shown in FIG. 4. When the flow control valve 36 is in the actuated condition shown in FIG. 4, high pressure fluid is ported from the conduit 58 through the orifice 80 to the up stroke actuator assembly 28. This results in an increase the displacement of the pump 20 in response to the increased demand for steering fluid.

When the displacement of the pump 20 has been increased sufficiently to satisfy the increased demand for steering fluid, the pressure on the upstream side of the orifice 148 in the steering controller 48 (FIG. 4) increases. This increases the fluid pressure in the biasing chamber 64 to operate the flow control valve 36 back to the intermediate condition shown in FIG. 2.

When the demand for fluid during a steering operation is decreased due to a reduction in the rate of rotation of the steering wheel 50, the size of the orifice 148 is decreased. The reduction in the size of the orifice 148 results in an increase in fluid pressure on the upstream side of the orifice and a reduction in the fluid pressure on the downstream side of the orifice. Therefore the fluid pressure in the conduit 54 is increased and the fluid pressure in the conduit 92 is decreased.

Figure 5:
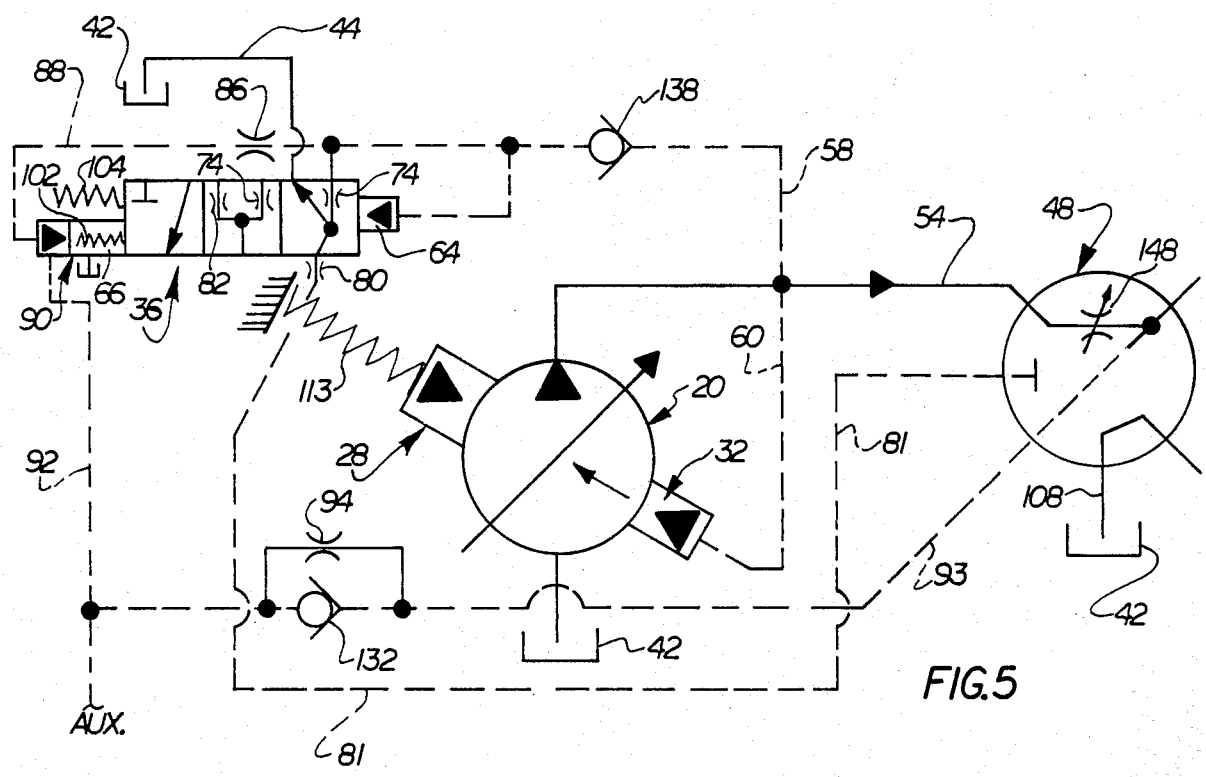
FIG. 5 is a schematic illustration, generally similar to FIG. 4, illustrating the flow control valve in an actuated condition directing fluid flow from the motor assembly to decrease the displacement of the pump in response to a decrease in demand for steering fluid.

The combined effect of the changes in the fluid pressures in the conduits 54 and 92 causes the flow control valve 36 to be actuated from the intermediate condition shown in FIG. 2 to the actuated condition shown in FIG. 5. Specifically, the increase in fluid pressure in the conduit 54 is transmitted through the check valve 138 to the pressure chamber 64. The increase in fluid pressure in the chamber 64 urges the flow control valve from the intermediate condition shown in FIG. 2 toward the actuated condition shown in FIG. 5. In addition, the decrease in fluid pressure in the conduit 92 is transmitted to the valve biasing assembly 90 through the orifice 94. The reduction in the fluid pressure in the biasing assembly 90 also promotes movement of the spool 38 of the flow control valve 36 from the intermediate condition shown in FIG. 2 to the actuated condition shown in FIG. 5.

When the flow control valve 36 is in the actuated condition shown in FIG. 5, the up stroke actuator assembly 28 is connected with the reservoir 42 through the orifice 80 and conduit 44. In addition, the pressure in the down stroke actuator assembly 32 is increased. Specifically, the reduction in the size of the orifice 148 in the steering controller 48 causes an increase in the fluid pressure in the conduit 54. The fluid pressure in the conduit 54 is communicated through the conduit 60 to the down stroke actuator 32. The reduction in pressure in the up stroke actuator assembly 28 and the increase in pressure in the down stroke actuator assembly 32 both cause the motor assembly 24 to reduce the displacement of the pump 20.

At the end of the steering operation, the orifice 148 is closed to block fluid flow through the steering controller 48 in the manner shown in FIG. 2. At the same time, the pilot flow conduit 81 is connected with reservoir 42 through the variable size orifice 106 in the controller 48. In addition, the pilot flow conduit 92 is connected with reservoir by the controller 48 (FIG. 2). Since the demand for fluid is decreased as the rotation of the steering wheel 50 is terminated, the flow control valve 36 will be in the actuated condition shown in FIG. 5 immediately before termination of the steering operation. This causes the motor assembly 24 to reduce the displacement of the pump 20 until it is just able to provide the pilot fluid flow. The biasing forces in the chamber 64 and biasing assembly 90 then cause the flow control valve 36 to move to the intermediate condition shown in FIG. 2.

The vehicle engine may be turned off when the flow control valve 36 and steering controller 48 are in the condition shown in FIG. 2. Turning off the engine interrupts operation of the engine driven pump 20 and the flow of pilot fluid. Therefore, the relatively strong biasing spring 114 (FIG. 1) in the up stroke actuator assembly 28 moves the control lever 22 to a maximum displacement condition. In addition, the biasing spring 104 moves the flow control valve spool 38 to the actuated condition shown in FIG. 4.

Upon subsequent restarting of the engine and driving of the pump 20, the pump is in a maximum displacement condition. A relatively large fluid pressure rapidly accumulates in the conduit 54. However, the conduit 54 is blocked by the steering controller 48. Therefore, the relatively high fluid pressure in the conduit 54 is transmitted to the pressure chamber 64 to urge the flow control valve 36 from the actuated condition shown in FIG. 4 to the actuated position shown in FIG. 5. The up stroke actuator assembly 28 is then connected with reservoir in the manner previously explained. In addition, a relatively high fluid pressure is conducted to the down stroke actuator assembly 32 through the conduit 60. Therefore, the displacement of the pump 20 is decreased until it corresponds to a displacement necessary to provide a pilot fluid flow. When this displacement is reached, the flow control valve 36 is actuated to the intermediate position shown in FIG. 2 and the displacement of the pump 20 is maintained constant unitl a steering operation is undertaken.

SUMMARY

The present invention provides a steering control apparatus 10 which includes a variable displacement pump 20. Upon initiation of a steering operation, the displacement of the pump 20 is quickly increased without waiting for actuation of the flow control valve 36. The pump 20 is thus able to satisfy the demand for power steering fluid during an initial portion of a steering operation.

In order to provide a rapid increase in the displacement of the pump 20 without waiting for actuation of the flow control valve 36, a steering controller 48 restricts or blocks a flow of pilot fluid from a chamber 110 of a pump displacement control motor 24 upon initiation of a steering operation. Restricting the fluid flow increases the fluid pressure in the chamber 110 to operate the motor 24 and increase the displacement of the pump 20. Since the flow fluid is immediately restricted by the steering controller 48 (FIG. 3) without waiting for actuation of the flow control valve 36, the displacement of the pump 20 can be quickly increased upon initiation of a steering operation to satisfy an impending demand for steering fluid.

What is claimed is:

1. An apparatus for effecting operation of a steering motor to turn a steerable vehicle wheel, said apparatus comprising
   a variable displacement pump,
   fluid pressure responsive motor means connected with said pump for varying the displacement of said pump in response to variations in fluid pressure conducted to said motor means,
   valve means connected in fluid communication with said motor means and operable to vary the fluid pressure conducted to said motor means during a steering operation to effect variations in the displacement of said pump,
   steering controller means for controlling operation of the steering motor and for varying the fluid pressure conducted to said motor means independently of operation of said valve means upon initiation of a steering operation to thereby increase the displacement of said pump,
   said fluid pressure responsive motor means including a variable volume chamber,
   conduit means for conducting a pilot flow of fluid from said variable volume chamber to said steering controller means, and
   said steering controller means including means for restricting the pilot flow from said variable volume chamber upon initiation of a steering operation to thereby increase fluid pressure in said variable volume chamber to provide for increase in the displacement of said pump in response to the initiation of the steering operation.

2. An apparatus as set forth in claim 1 wherein said valve means includes means for directing fluid flow to said variable volume chamber when said valve means is operated to a first condition and for directing fluid flow from said variable volume chamber when said valve means is in a second condition, said valve means being movable between said first and second conditions under the influence of a fluid pressure which varies as a function of variations in the demand for fluid during a steering operation.

3. An apparatus as set forth in claim 1 wherein said valve means includes fluid pressure responsive actuator means for operating said valve means from a first condition to a second condition to vary the fluid pressure conducted to said fluid pressure responsive motor means and increase the displacement of said pump, said apparatus further including means for conducting a pilot flow of fluid from said actuator means to said steering controller means prior to initiation of a steering operation, said steering controller means including means for restricting the pilot flow of fluid from said actuator means upon initiation of a steering operation to provide for operation of said actuator means to operate said valve means from the first condition to the second condition.

4. An apparatus for effecting operation of a steering motor to turn a steerable vehicle wheel, said apparatus comprising
   a variable displacement pump, fluid pressure responsive motor means connected with said pump for varying the displacement of said pump in response to variations in fluid pressure conducted to said motor means, valve means connected in fluid communication with said motor means and operable to vary the fluid pressure conducted to said motor means during a steering operation to effect variations in the displacement of said pump, and steering controller means for controlling operation of the steering motor and for varying the fluid pressure conducted to said motor means independently of operation of said valve means upon initiation of a steering operation to thereby increase the displacement of said pump, said motor means including first actuator means which increases the displacement of said pump in response to an increase in fluid pressure and second actuator means which decreases the displacement of said pump in response to an increase in fluid pressure, first conduit means for conducting to said first and second actuator means fluid pressures which vary during a steering operation as a function of the demand for fluid by the steering motor, second conduit means connected in fluid communication with said first actuator means and said steering controller means for conducting a pilot flow of fluid from said first actuator means to said steering controller means, said steering controller means including means for restricting the pilot flow of fluid upon initiation of a steering operation to thereby increase the fluid pressure in said first actuator means, and check valve means connected with said first conduit means for blocking transmission of the increase in fluid pressure in said first actuator means to said second actuator means upon restricting of the pilot flow of fluid.

5. An apparatus as set forth in claim 4 wherein said first conduit means is connected in fluid communication with said first actuator means through said valve means, said valve means being operable between a first condition directing fluid flow from said first conduit means to said first actuator means to increase the fluid pressure in said first actuator means and a second condition directing fluid flow from said first actuator means to decrease the fluid pressure in said first actuator means.

6. An apparatus as set forth in claim 5 wherein said valve means includes chamber means for holding fluid under pressure to urge said valve means toward the first condition under the influence of a fluid pressure force which varies as a function of variations in the fluid pressure in said first conduit means.

7. An apparatus for effecting operation of a steering motor to turn a steerable vehicle wheel, said apparatus comprising a variable displacement pump, fluid pressure responsive motor means for varying the displacement of said pump, said motor means including first actuator means which increases the displacement of said pump in response to an increase in fluid pressure and second actuator means which decreases the displacement of said pump in response to an increase in fluid pressure, steering controller means connected in fluid communication with said pump and steering motor for directing fluid to the steering motor during a steering operation, first conduit means connected in fluid communication with said first and second actuator means for conducting fluid pressures which vary as a function of variations in the demand for fluid by the steering motor, second conduit means connected in fluid communication with said first actuator means and said steering controller means for conducting a pilot flow of fluid from said first actuator means to said steering controller means to thereby tend to decrease the fluid pressure in said first actuator means, said steering controller means including means for restricting the pilot flow of fluid upon initiation of a steering operation to thereby increase the fluid pressure in said first actuator means and initiate operation of said first actuator means to increase the displacement of said pump, and check valve means connected with said first conduit means for blocking transmission of an increase in fluid pressure in said first actuator means to said second actuator means upon restricting of the pilot flow of fluid by said steering controller means.

8. An apparatus as set forth in claim 7 further including valve means connected in fluid communication with said first conduit means and said first actuator means for varying the fluid pressure in said first actuator means as a function of the demand for steering fluid by the steering motor.

9. An apparatus for effecting operation of a steering motor to turn a steerable vehicle wheel, said apparatus comprising a variable displacement pump, fluid pressure responsive motor means connected with said pump for varying the displacement of said pump in response to variations in fluid pressure conducted to said motor means, said motor means including means for defining a variable volume chamber which increases in size in response to an increase in the pressure of fluid in said chamber and means for varying the displacement of said pump in response to an increase in the size of said chamber, steering controller means for controlling operation of the steering motor, first conduit means for conducting fluid from said variable displacement pump into said variable volume chamber, and second conduit means for conducting a flow of fluid from said variable volume chamber to said steering controller means, said steering controller means including means for restricting the flow of fluid from said chamber upon initiation of a steering operation to effect an increase in the size of said chamber.

10. An apparatus as set forth in claim 9 further including valve means connected in fluid communication with said pump and said chamber for varying the fluid pressure in said chamber during a steering operation to thereby vary the size of said chamber and the displacement of said pump.

* * * * *